United States Patent [19]
Witman

[11] 3,819,438
[45] June 25, 1974

[54] METHOD FOR PREPARING DIMENSIONALLY STABLE PLASTIC SURFACE COVERINGS

[75] Inventor: Jack H. Witman, Lancaster, Pa.

[73] Assignee: Armstrong Cork Company, Lancaster, Pa.

[22] Filed: June 27, 1972

[21] Appl. No.: 266,585

[52] U.S. Cl............. 156/79, 117/72, 117/138.8 A, 117/116, 161/124, 161/160, 161/161, 161/166, 161/DIG. 3, 264/47, 264/52
[51] Int. Cl.................... B32b 5/18, B32b 31/14
[58] Field of Search.................. 156/79; 264/47, 52; 161/160, 161, 116, 124, DIG. 3; 117/138.8 A, 138.8 E, 72

[56] References Cited
UNITED STATES PATENTS

| | | | |
|---|---|---|---|
| 2,941,917 | 6/1960 | Anspon et al...................... | 161/254 |
| 3,213,071 | 10/1965 | Campbell.......................... | 156/79 X |
| 3,365,353 | 1/1968 | Witman ............................ | 156/79 X |
| 3,519,527 | 7/1970 | Crowley............................ | 264/47 X |
| 3,538,204 | 11/1970 | Grubb............................... | 264/46 X |
| 3,591,401 | 7/1971 | Snyder et al...................... | 264/47 X |
| 3,608,006 | 9/1971 | Hosoda et al......................... | 156/79 |
| 3,645,837 | 2/1972 | Chisholm et al.................. | 264/47 X |
| 3,657,036 | 4/1972 | Millenhoff et al. ............... | 156/79 X |

Primary Examiner—George F. Lesmes
Assistant Examiner—Stanley S. Silverman
Attorney, Agent, or Firm—Theodore L. Thomas

[57] ABSTRACT

A flexible, dimensionally stable plastic surface covering having a non-foamed poly(vinyl chloride) layer containing cross-linked polymer positioned between two foamed poly(vinyl chloride) layers, and having a wear resistant top coat on the surface of the system. One or more of the foamed surfaces may be embossed, and the top foamed surface may carry a printed decoration thereon.

7 Claims, 3 Drawing Figures

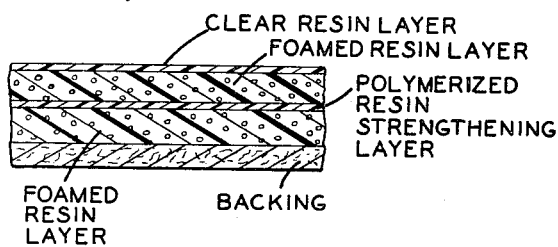
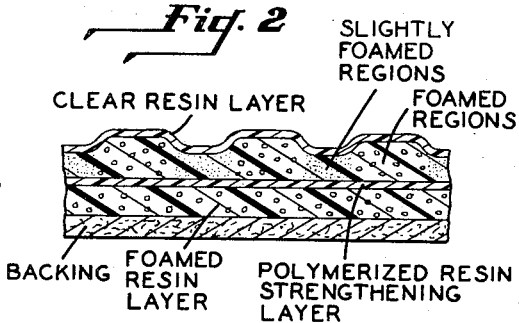
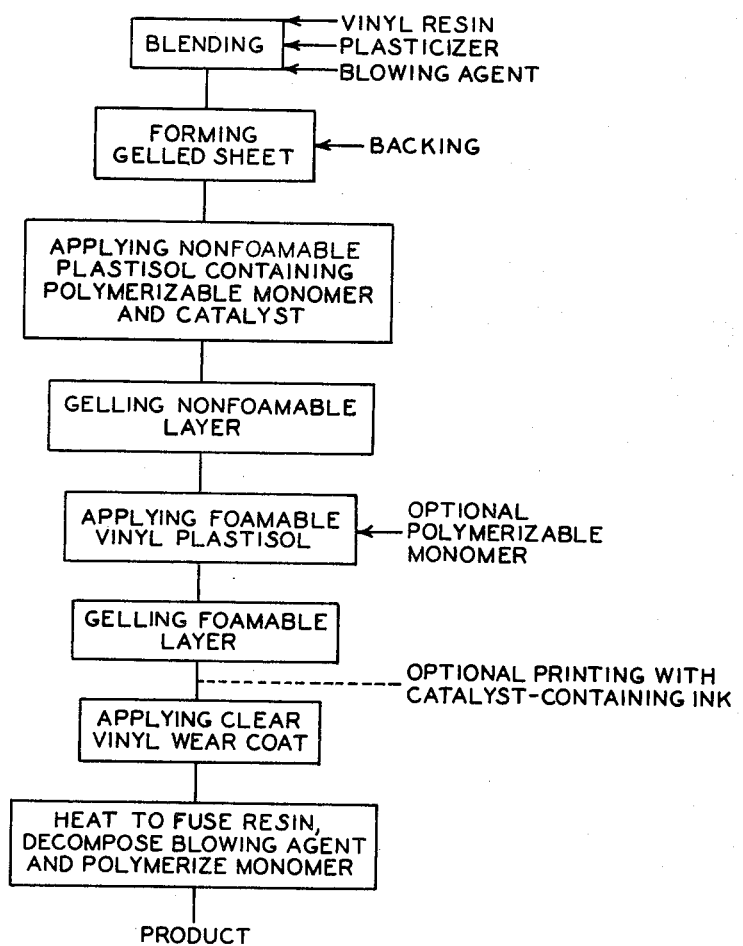

METHOD FOR PREPARING DIMENSIONALLY STABLE PLASTIC SURFACE COVERINGS

BACKGROUND OF THE INVENTION

1. Field of the Invention

This invention relates to flexible, foamed plastic surface covering having a strengthening or dimensionally stabilizing layer containing cross-linked polymer between two foam layers. This invention also relates to such a structure wherein a fluid-supplied intermediate coating including a polymerizable monomer and a catalyst therefor is polymerized in situ to form such a strengthening layer. The invention in one important embodiment is an improvement over the foamed surface covering described and claimed in U.S. Pat. No. 3,365,353-Witman, the disclosure of which is incorporated herein by reference.

2. Description of the Prior Art

In the manufacture of surface coverings in general and flexible floor coverings in particular, it has been previously known to include an intermediate layer such as a scrim material in a laminated structure of this type to strengthen and dimensionally stabilize the structure. These prior methods, however, involved width and processing problems which rendered wide coverings economically unattractive.

The prior art also includes the use of various adhesives to secure the laminae of plastic floor coverings together, but adhesives may allow separation of laminae during processing and changes in dimension of the product.

U.S. Pat. No. 3,196,030-Petry teaches the formation of a reinforcing layer in a vinyl foam surface covering by passing a vinyl foam sheet between densifying rolls while a layer of the vinyl foam is hot enough to be permanently collapsed to form the reinforcing layer.

U.S. Pat. No. 2,941,917 discloses a method of making laminated polymer sheets of rigid, transparent material having a strengthening inner layer by polymerizing, by use of a catalyst and/or application of heat, an acrylic or methacrylic ester monomer layer between two external layers of polymethyl α-chloroacrylate.

U.S. Pat. No. 3,558,427 teaches adding a polymerizable monomer and a polymerization catalyst to a slurry of fibers and binder in a beater saturation process, forming a sheet therefrom, and subjecting the sheet to heat to bring about polymerization of the monomer.

The prior art methods do not teach the provision in a flexible, foamed plastic floor covering of an intermediate, fluid-applied, strengthening layer which is flexible, resists stretch, and which stabilizes the floor covering during use. In addition, width limitations normally encountered in the use of glass scrim material and the like as the intermediate strengthening layer in a structure of this type are eliminated.

SUMMARY OF THE INVENTION

The method of the invention contemplates forming a dimensionally stable plastic surface covering by forming and gelling a foamable poly(vinyl) chloride) layer on a backing, applying as a fluid and gelling a non-foamable coating at least 4 mils thick of poly(vinyl chloride) containing a reactive monomer and a polymerization catalyst therefor to the first gelled foamable plastisol layer, applying and gelling another layer of foamable poly(vinyl chloride) plastisol on top of the non-foamable layer, applying a clear non-foamable poly(vinyl chloride) top coating, and heating the entire system to a temperature sufficiently high to fuse and foam the resins and cause the polymerization catalyst to polymerize and cross-link the monomer in the intermediate, non-foamable layer, thus forming a foamed, flexible plastic surface having a tough, dimensionally stabilizing inner layer. The two foamed layers may have different densities, and preferably the top foamed layer will have the higher density.

BRIEF DESCRIPTION OF THE DRAWING

FIG. 1 is a cross-sectional view of the smooth-surfaced product of this invention, FIG. 2 is a cross-sectional view of an embossed product obtained by inclusion of certain optional steps in the process of this invention, and FIG. 3 is a simplified flow diagram of the preferred process of the present invention. The legends on all figures are self-explanatory.

DESCRIPTION OF THE PREFERRED EMBODIMENTS

The thermoplastic resins useful in forming the foamed and unfoamed lamina of the surface covering of the present invention are those resins capable of forming films and sheets. Poly(vinyl chloride) is the preferred resin, although copolymers of vinyl chloride with minor proportions of other materials such as vinyl acetate, vinylidene chloride, other vinyl esters such as vinyl proprionate, vinyl butyrate, as well as alkyl substituted vinyl esters may be used. The glass transition temperature of these resins is the temperature at which the resin changes from a hard, brittle solid to a flexible solid. Increasing plasticization of the resin increasingly lowers the glass transition temperature.

In making the surface covering according to the method of this invention, the thermoplastic resin, preferably poly(vinyl chloride) as described above, will be combined with a plasticizer therefor and other desired ingredients to form a plastisol in a known manner such as those described in aforesaid U.S. Pat. No. 3,365,353-Witman. The plastisol may then be conveniently applied to a substrate and gelled to form a sheet. Suitable plasticizers are the ester-type plasticizers such as dioctyl phthalate, dioctyl sebacate, dioctyl adipate, diocytl azelate, in which the octyl group is frequently in the form of a 2-ethyl hexyl group. Other alkyl groups can be used in place of the octyl group to yield, for example, plasticizers such as dibutyl phthalate, dibutyl sebacate, dibutyl adipate, and the like. The phosphate esters are also useful, for example tricresyl phosphate. The viscosity of the plastisol may be controlled to some extent by selection of a particular plasticizer, the particular resin, and the amounts of each to be used. Hence a range in viscosity is available depending on how a sheet is to be formed from the plastisol.

The blowing agent used in forming the foamed lamina of the surface covering of this invention must be thoroughly distributed throughout the resin-plasticizer mixture. A variety of blowing agents is available on the market for incorporation in thermoplastic resins. The preferred blowing agent for poly(vinyl chloride) is azodicarbonamide which normally decomposes at a temperature of about 390° F. in air. This blowing agent is particularly suitable for use in the method of the present invention in view of its relatively high decomposition temperature. The following table shows other usable blowing agents with the temperature at which they release gas vigorously in dioctyl phthalate:

| Blowing Agent | Temp.,°F. |
| --- | --- |
| Azobisisobutyronitrile | 240 |
| N,N'-dimethyl-N,N'-dinitrosoterephthalamide | 220 |
| p,p'-Oxybis(benzenesulfonylhydrazide) | 320 |
| p,p'-Oxybis(benzenesulfonylsemicarbazide) | 425 |
| Barium azodicarboxylate | above 480 |
| Dinitrosopentamethylenetetramine (80%) | 370 |

The usable blowing agents will generally comprise the substituted hydrazides, substituted azo compounds, are substituted nitroso compounds. In the plastisol used for forming the low density foamed base sheet or lamina, the blowing agent will normally be present in an amount in the range of about 1.5 to 5 percent based on the weight of the thermoplastic resin. In the plastisol used for forming the higher density foamed top lamina, the blowing agent will normally be present in an amount in the range of about 1 to 4 percent based on the weight of the thermoplastic resin. As a general rule, the preferred minimum decomposition temperature of the blowing agent should be about 320° F. and the blowing agent should decompose below the decomposition temperature of the resin, which in the case of poly(vinyl chloride) would be about 400° F. However, stabilized vinyl resin composition will normally not decompose until even higher temperatures—approaching 450° F.—are reached.

To these critical ingredients, namely, the resin, the plasticizer, and the blowing agent, additional ingredients such as blowing agent activators, pigments, dyes, or other decorative elements may be added to the composition to be formed into the sheets. Depending on the material used and the intensity of the color desired, the amounts of such extra additives will normally range from a small fraction of a percent to 20 percent by weight of the total composition. Relatively small amounts of a granular filler such as a clay, a limestone, or a silicate may be used. However, the foamable compositions will not be highly filled in view of a need for at least a portion thereof to expand and form a cellular or foamed layer. Fillers to be used, if any, will normally be present in less than about 20 percent by weight of the total composition. Blowing agent activators or accelerators such as the lead and zinc salts of organic acids will be present in amounts of 0.5 to 3 parts by weight per hundred of resin. Small amounts of heat and light stabilizers will also be incorporated. These are known in the art and may comprise the barium-cadmium salts of long-chain fatty acids, polyols such as pentaerythritol or alpha-methylglucoside, nitrogen compounds such as melamine or dicyandiamide, esters such as phenyl phthalate, phenyl benzoate, o-toluol benzoate, triethylene glycol salicylates, certain of the organic phosphates, and mixtures thereof. Such stabilizers will not normally be present in amounts greater than about 3 percent by weight of the total composition.

In making the foamable lamina of the surface covering of this invention, the several ingredients will be blended to achieve thorough distribution of one in the other in customary manner well known in the art. After thorough mixing has been achieved, the plastisol is formed into a sheet.

In forming the base sheet of the surface covering of this invention, the plastisol may be doctored, roll coated, or otherwise applied to a backing or to a strippable carrier which may be a steel belt, a rubber belt, paper, or a felt having a release coating thereon. Application of relatively gentle heat to the plastisol causes a low degree of fusion and thus gels and slightly sets the sheet so it may be removed or otherwise handled for further treatment. The amount of heat applied at this stage of the process is insufficient to decompose the blowing agent. The plastisol may also be applied directly onto a backing which is to become a permanent part of the surface covering. The backing would be one suitable for use as a surface covering, for example, a felt, preferably a rubber-bonded asbestos backing, a vinyl sheet backing, a cellulosic felt or other backing which lends itself to surface covering applications.

Instead of a plastisol, an organosol may be used in which an organic solvent is added to the resin-plasticizer mixture. The addition of such solvents is a further control in the viscosity of the fluid, and such solvents as the ketones, for example, methyl ethyl ketone and methyl isobutyl ketone, may be used. Hydrocarbon aromatic solvents may be used, for example toluene and xylene. Aliphatics may be used such as are obtained in certain cuts from fractionation of hydrocarbon mixtures used in the oil industry. A disadvantage, however, of using an organosol instead of a straight plastisol in the present process is that the solvent will be driven off during the incipient gelation stage and must either be recovered or otherwise removed from the sphere of operations when heat is applied to the organosol.

The top, or high density foamed lamina of the surface covering of this invention is produced using essentially the same process and ingredients as that used to form the foamable base sheet with the exception that a lesser amount of blowing agent is used in the top sheet, thereby resulting in a higher density sheet. Suitable selection and/or variation in the type and amount of blowing agent accelerator may also be utilized to vary the density of the sheet.

The process so far has produced thermoplastic sheets which will normally have at this stage of the process a thickness of the bottom sheet in the range of about 0.005 to 0.050 inch, exclusive of any backing, and a top sheet thickness in the range of about 0.004 to 0.040 inch. The sheets will contain thoroughly distributed therein a blowing agent in condition to liberate gas when sufficient heat has been applied thereto.

The non-foamable strengthening layer to be formed between the foamable base sheet and the foamable top sheet is formed utilizing the resins and plasticizers previously described in connection with the foamable lamina. In forming this strengthening layer, the blowing agent is omitted and a polymerizable monomer and a polymerization catalyst therefor are included. The monomer used must have at least two olefinically unsaturated sites in its molecule. Not only does the monomer polymerize and cross-link under the conditions to be described below, but it, or the polymerization catalyst, will also apparently cause cross-linking of the poly(vinyl chloride) chains. The cross-linking imparts particular strength to the reinforcing layer and causes significant improvement in the dimensional stability of the finished product. The monomer must be compatible with the vinyl resin, that is, it must be miscible therewith and be capable of being intimately dispersed therein instead of occupying discrete volumes in the plastisol. Examples of usable polymerizable monomers are the di- and poly- acrylates and methacrylates prepared by the esterification of alcohols with acrylic acid and methacrylic acid. Monoacrylates and methacrylates are usable where the esterifying portion of the alcohol itself contains an olefinically unsaturated bond, as is the case in allyl acrylates. Dicarboxylic acids may be esterified with unsaturated alcohol to produce such usable monomers as diallyl fumarate. Diolefinically unsaturated hydrocarbons such as divinyl benzenes, divinyl toluene, and the like also function to polymerize and to cross-link in the present process. As used herein, the term monomer means a compound of relatively low molecular weight compared with the polymers it forms. As emphasized above, the only requirement for this polymerizable monomer is that it be compatible with the plastisol system and that it have two olefinically unsaturated sites in the molecule which will allow the compound to polymerize and cross-link under the conditions of temperature and catalyst to be described below. The polymerizable monomer, depending on the composition, will generally be present in the range of about 5 to 75 percent by weight based on the weight of the thermoplastic resin.

The catalysts used in forming the non-foamable, polymerizable layer of the surface covering of this invention are the known free radical catalysts widely used to enhance polymerization of olefinically unsaturated compounds. They comprise primarily the organic per-compounds. Among the peroxides that are usable are di-t-butyl peroxide, benzoyl peroxide, lauroyl peroxide, capryloyl peroxide, acetyl peroxide, p-chlorobenzoyl peroxide, cumene hydroperoxide, cyclohexanone peroxide, t-butyl peracetate, and the other known peroxide initiators. Large numbers of such peroxides exist, and generally they are broken down into broader groups comprising low-temperature types, intermediate-temperature types, and high-temperature types. The high-temperature types are those generally decomposing above 250°F. Other per-compounds such as t-butyl perbenzoate, and isopropyl-percarbonate are usable in the present process. Besides the per-compound type of free-radical initiators, there may be used such aliphatic azocatalysts as alpha,alpha'-azodiisobutyronitrile.

In forming the non-foamable strengthening layer, the resin, plasticizer, monomer, and catalyst are mixed. The catalyst may require a carrier liquid which is preferably a diluent, solvent, or plasticizer for the particular resin in the plastic sheet. For example, a mixture of methyl ethyl ketone and dioxane serves as an excellent carrier for many of these catalysts. The liquid chosen should be such that the catalyst is soluble therein, or at least partly soluble therein, in order that maximum contact be established between the catalyst and the polymerizable monomer distributed throughout the plastisol. Where the catalyst is soluble in plasticizers such as tributoxy ethyl phosphite and dibutyl phthalate, then the plasticizers alone may serve as carriers for the catalyst.

Application of the plastisol containing the catalyst and monomer may be carried out in any convenient manner, such as by doctoring, roll coating, printing, curtain coating, or any other convenient manner in a thickness of at least 4 mils to provide the required strength. Depending on the use of the final product, the strengthening layer may be as much as 125 mils in thickness.

In making the surface covering of this invention as previously stated, the bottom foamable plastisol layer may be applied to a permanent backing or to a strippable carrier followed by the application of relatively gentle heat to gel the sheet. To the sheet so formed is then applied and gelled the liquid plastisol containing the polymerizable monomer and the catalyst therefor. Onto this is then applied the top foamable plastisol layer which was made as previously described. A clear plastisol wear layer may be then applied over the top foamable layer and the composite structure may then be heated to a temperature in the range sufficiently high that the polymerization catalyst initiates polymerization of the polymerizable monomer in the intermediate strengthening layer and foams and fuses the resin in the remaining layers.

An embossed appearance may be achieved on the surface covering of this invention by including in the composition of the top foamable layer a polymerizable monomer of the same characteristics as those described for use in the non-foamable reinforcing layer. The top layer would be printed with a decorative pattern, and one or more of the inks would contain a polymerization catalyst, the process being set forth in the aforesaid U.S. Pat. No. 3,365,353-Witman. Mechanical embossing can be used.

The following examples illustrate several embodiments of the invention. All parts are by weight unless otherwise stated.

Example 1

The following plastisol was prepared by thoroughly mixing the following ingredients in a change-can mixer.

| Ingredients | Parts |
| --- | --- |
| Poly(vinyl chloride) resins | 3000.0 |
| Di-2-ethyl hexyl phthalate | 1450.0 |
| Epoxidized tallate | 150.0 |
| Zinc octoate | 72.0 |
| Azodicarbonamide/DOP:60/40 | 180.0 |
| TiO$_2$ pigment/DOP:58/42 | 259.5 |

Another plastisol was formed in a similar manner by mixing the following ingredients in a change-can mixer.

| Ingredients | Parts |
| --- | --- |
| Poly(vinyl chloride) resins | 3000.0 |
| Di-2-ethyl hexyl phthalate | 1167.0 |
| Epoxidized tallate | 150.0 |
| Zinc octoate | 60.0 |
| TiO$_2$/DOP:58/42 | 252.0 |
| Azodicarbonamide/DOP:60/40 | 150.0 |

Non-foamable plastisol was formed by thoroughly mixing the following ingredients.

| Ingredients | Parts |
| --- | --- |
| Poly(vinyl chloride) resins | 3000.0 |
| Di-2-ethyl hexyl phthalate | 210.0 |
| Epoxidized tallate | 150.0 |
| Calcium carbonate | 300.0 |
| Trimethylol propane trimethacrylate | 900.0 |
| Pigment dispersion | 30.0 |
| Lauroyl peroxide | 2.7 |

The first-formed plastisol was applied on a releasable backing having a thickness of 0.042 inch. The plastisol was applied with a reverse roll coater in a wet thickness of 22 mils. The plastisol-coated backing was gelled in an oven for 1½ minutes at 385°F.

The non-foamable fluid plastisol was then applied by means of a reverse roll coater in a wet thickness of 10 mils onto the first-formed sheet and gelled at 275°F. for 3 minutes. The second foamable plastisol coating or top foamable coating was then applied and gelled in an oven for 4 minutes at 275°F. A clear coating of poly(vinyl chloride) plastisol was then applied over the entire sheet. The composite structure was then heated at about 385°F. for 3½ minutes to cause fusion of the resin, decomposition of the blowing agent, and polymerization of the monomer. The clear coat also fused and became an integral part of the system covering the sheet. A strong, flexible, dimensionally stable sheet resulted.

Example 2

Example 1 was repeated. However, this time the amount of the trimethylol propane trimethacrylate monomer in the intermediate, non-foamable layer was reduced to 20 parts. Ten parts by weight of the polymerizable monomer was included in the foamable top layer. Additionally, prior to application of the wear layer, the foamable top sheet containing the polymerizable monomer was printed in a decorative pattern with an ink containing a catalyst for the polymerizable monomer and having the following composition:

| Restrictor Ink Formula | Parts |
| --- | --- |
| Poly(vinyl chloride)/poly(vinyl acetate) copolymer | 25.0 |
| Benzoyl peroxide/dibutyl phthalate paste (60/40 ratio) | 18.0 |
| Methyl isobutyl ketone | 20.0 |
| Cellosolve acetate | 20.0 |
| Methyl ethyl ketone | 50.0 |
| Pigment - TiO$_2$ | 5.0 |

After the ink containing the catalyst was applied to the surface of the foamable top sheet, the sheet was dried without causing foaming by the application of gentle heat. A clear plastisol coating of Example 1 was then applied over the printed, foamable, monomer-containing sheet and the entire structure was then heated in an oven for 3½ minutes at a temperature of 385°F.

Expansion of the foamable top sheet occurred to a significantly greater extent in the unprinted areas than beneath the printed area, producing a decorative embossed appearance on the final, dimensionally stable sheet.

What is claimed is:

1. The method of forming a flexible, cellular, dimensionally stable plastic surface covering which comprises forming a first and a second foamable plastisol by blending
   1. a vinyl resin,
   2. a plasticizer for said vinyl resin,
   3. a blowing agent which decomposes at a temperature in the range above the glass transition temperature of the plasticized vinyl resin and below the decomposition temperature of said resin, forming said first foamable plastisol into a gelled sheet and applying to the top surface thereof, a nonfoamable vinyl resin plastisol coating containing a reactive monomer compatible with the vinyl resin therein and containing at least two olefinically unsaturated sites, and also containing a catalyst that will cause polymerization and cross linking of said monomer in said temperature range, gelling said nonfoamable resinous coating, applying a coating of said second foamable plastisol onto said gelled, nonfoamable resinous coating, gelling said second foamable plastisol coating, applying a final, clear, nonfoamable resinous coating onto said gelled second foamable plastisol coating and subjecting the composite structure to sufficient heat to fuse the vinyl resins, polymerize and cross-link the monomer, and decompose the blowing agent to form a cellular structure.

2. The method according to claim 1 wherein said vinyl resin comprises poly(vinyl chloride).

3. The method according to claim 2 wherein the amount of blowing agent in the first formed foamable plastisol is different from the amount of blowing agent in the second formed foamable plastisol.

4. The method according to claim 1 wherein the blowing agent is azodicarbonamide.

5. The method according to claim 1 wherein the monomer in the nonfoamable plastisol is present in the amount of from about 5 to 75 percent by weight based on the weight of the resin.

6. The method according to claim 1 wherein said monomer comprises trimethylol propane trimethacrylate.

7. The method according to claim 1 wherein the catalyst in the nonfoamable plastisol is lauroyl peroxide.

* * * * *